(12) United States Patent
Boettiger (10) Patent No.: US 7,378,199 B2
(45) Date of Patent: May 27, 2008

(54) MICRO-LENSES AND METHOD FOR INCREASING AREA COVERAGE AND CONTROLLING SHAPE OF MICRO LENSES

(75) Inventor: Ulrich C. Boettiger, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 519 days.

(21) Appl. No.: 11/019,233

(22) Filed: Dec. 23, 2004

(65) Prior Publication Data

US 2005/0099696 A1 May 12, 2005

Related U.S. Application Data

(62) Division of application No. 10/603,786, filed on Jun. 26, 2003, now Pat. No. 6,995,911.

(51) Int. Cl.
*G02B 3/00* (2006.01)

(52) U.S. Cl. .......................... 430/7; 430/330

(58) Field of Classification Search ................ None
See application file for complete search history.

(56) References Cited

U.S. PATENT DOCUMENTS

| 5,561,008 | A | 10/1996 | Berger et al. |
| 5,633,527 | A | 5/1997 | Lear |
| 6,707,612 | B2 | 3/2004 | Ohtsu et al. |

FOREIGN PATENT DOCUMENTS

JP 11-048354 A * 2/1999

* cited by examiner

*Primary Examiner*—John A. McPherson
(74) *Attorney, Agent, or Firm*—Dickstein Shapiro LLP

(57) ABSTRACT

Micro-lenses for use in imagers and their method of manufacture from intermediate lens structures are described. Lithographic masks are used to remove unwanted portions from the intermediate lens structures and to remove cut-out portions from the intermediate lens structures to alter the radius of the resultant micro-lenses. Lithographic masks are also used to inhibit pull-back of the micro-lenses during a reflow step.

26 Claims, 8 Drawing Sheets

MICRO-LENSES AND METHOD FOR INCREASING AREA COVERAGE AND CONTROLLING SHAPE OF MICRO LENSES

This application is a divisional of U.S. patent application Ser. No. 10/603,786, which was filed Jun. 26, 2003, now U.S. Pat. No. 6,995,911, the disclosure of which is hereby incorporated herein by reference in its entirety.

FIELD OF THE INVENTION

The present invention relates generally to the field of semiconductor devices and more particularly, to semiconductor image sensors and display devices.

BACKGROUND

The semiconductor industry currently uses different types of semiconductor-based imagers, such as charge coupled devices (CCDs), complementary metal oxide semiconductor (CMOS) devices, photodiode arrays, charge injection devices and hybrid focal plane arrays, among others.

Because of the inherent limitations in CCD technology, CMOS imagers are being increasingly used as low cost imaging devices. A fully compatible CMOS sensor technology enabling a higher level of integration of an image array with associated processing circuits would be beneficial to many digital applications such as, for example, in cameras, scanners, machine vision systems, vehicle navigation systems, video telephones, computer input devices, surveillance systems, auto focus systems, star trackers, motion detection systems, image stabilization systems and data compression systems for high-definition television.

A CMOS imager circuit includes a focal plane array of pixel cells, each one of the cells including a photoconversion device, for example, a photogate, photoconductor, or a photodiode for accumulating photo-generated charge in a portion of the substrate. A readout circuit is connected to each pixel cell and includes at least an output transistor, which receives photogenerated charges from a doped diffusion region and produces an output signal which is periodically read out through a pixel access transistor. The imager may optionally include a transistor for transferring charge from the photoconversion device to the diffusion region or the diffusion region may be directly connected to or part of the photoconversion device. A transistor is also typically provided for resetting the diffusion region to a predetermined charge level before it receives the photoconverted charges.

In a CMOS imager, the active elements of a pixel cell perform the necessary functions of: (1) photon to charge conversion; (2) accumulation of image charge; (3) transfer of charge to the floating diffusion node accompanied by charge amplification; (4) resetting the floating diffusion node to a known state before the transfer of charge to it; (5) selection of a pixel for readout; and (6) output and amplification of a signal representing pixel charge. Photo charge may be amplified when it moves from the initial charge accumulation region to the floating diffusion node. The charge at the floating diffusion node is typically converted to a pixel output voltage by a source follower output transistor.

Each pixel cell receives light focused through one or more micro-lenses. Micro-lenses on a CMOS imager help increase optical efficiency and reduce cross talk between pixel cells. A reduction of the size of the pixel cells allows for a greater number of pixel cells to be arranged in a specific pixel cell array, thereby increasing the resolution of the array. In one process for forming micro-lenses, the radius of each micro-lens is correlated to the size of the pixel cell. Thus, as the pixel cells decrease in size, the radius of each micro-lens also decreases.

Figure 1:
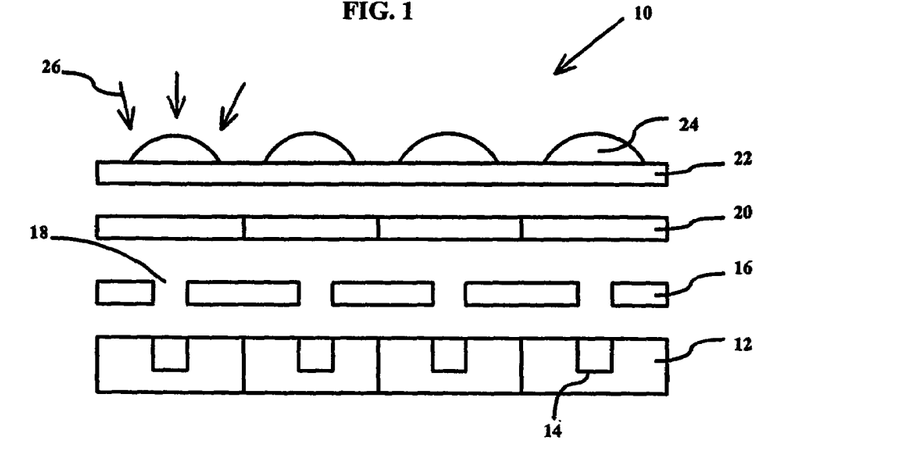
FIG. 1 is an exploded schematic view of an array of conventional micro-lenses in a CMOS imager.
Figure 2A:
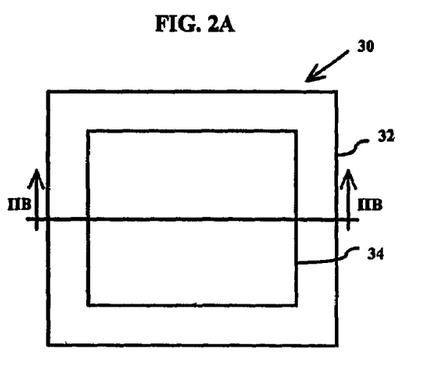
FIG. 2A is a plan view of an intermediate lens structure to be formed into a conventional micro-lens.
Figure 2B:
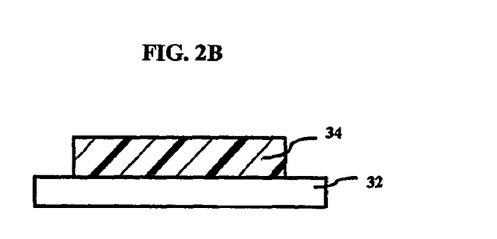
FIG. 2B is a cross-sectional view of the intermediate lens structure of FIG. 2A taken along line IIB-IIB.
Figure 2C:
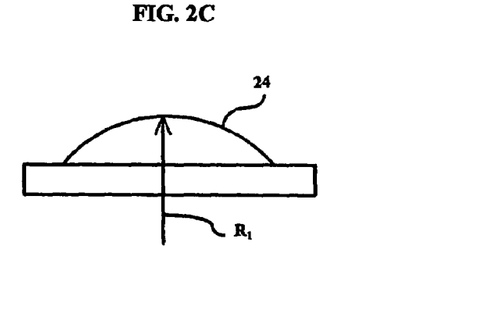
FIG. 2C is a side view of one of the conventional micro-lenses of FIG. 1 formed from the intermediate lens structure of FIGS. 2A and 2B.
Figure 2D:
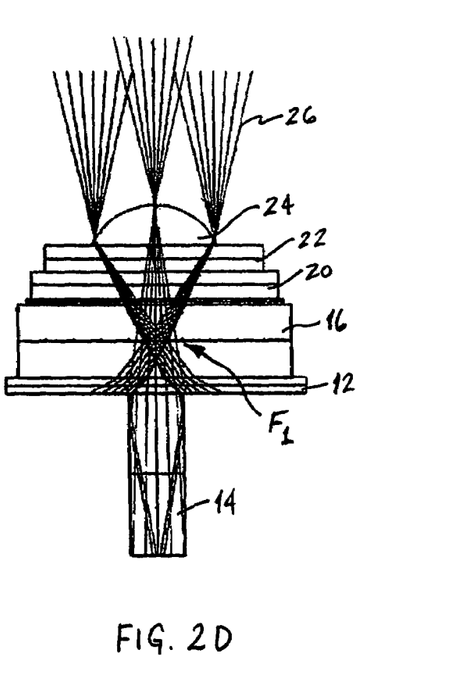
FIG. 2D is a side view of the micro-lens of FIG. 2C used with a CMOS imager.

For example, as shown in FIGS. 1 and 2D, a portion of a CMOS imager 10 is shown. FIG. 1 illustrates an array of pixel cells for the CMOS imager 10, while FIG. 2D illustrates a single pixel cell. The illustrated CMOS imager 10 has a micro-lens 24 mounted on a frame 22, a color filter 20, a mask 16, and a pixel cell 12 with a photoconversion device 14. Electromagnetic radiation, such as light 26, is collected by the micro-lenses 24 and transmitted through the gaps 18 in the mask 16 toward the photoconversion devices 14. With a reduction in the size of photoconversion devices 14, and hence the pixel cells 12, and no consequential change in the thicknesses of any of the frame 22, color filter 20, and/or mask 16, the reduced radius of each micro-lens 24 causes the light 26 to focus at a focal point $F_1$ above the respective photoconversion devices 14, thus causing a reduction of the amount of light received in the photoconversion devices 14 and an increase in cross talk between pixel cells 12.

It is desirable to increase the amount of light received by the photoconversion devices 14. One way to ensure that additional light is received by the photoconversion devices 14 is to increase the amount of light collected by the micro-lenses. One undesirable aspect encountered in conventional processes for forming micro-lenses is that the micro-lenses are subject to a size reduction. Specifically, one step in a conventional micro-lens formation process is to reflow an intermediate lens structure, which causes the intermediate lens structure to retreat, or pull back, at the corners and/or edges.

Referring specifically to FIGS. 2A-2C, 5A and 5B, intermediate lens structures 30 are formed of a lens material 34 on a wafer 32. The lens material 34 is preferably a transparent photosensitive polymer spin coated onto the wafer 32. Then, each intermediate structure 30 is exposed in a lithographic stepper with an image of the desired raw lens shape. Unwanted lens material is then removed from the intermediate lens structures 30 (such as around the periphery of each lens structure 30) in a wet developer. If the lens material 34 is formed of a positive resist, the exposed resist dissolves in the developer. If the lens material 34 is formed of a negative resist, the unexposed resist dissolves in the developer. Then, the intermediate lens structures 30 are reflowed to form the micro-lenses 24, each having a radius $R_1$. The radii of the thus formed micro-lenses can be influenced only slightly by changing reflow bake conditions, the thickness and/or the composition of the lens material 34.

The intermediate lens structure 30, which was initially rectangular in the X-Y, X-Z, and Y-Z planes (FIGS. 2A, 2B and 5A), was transformed into a micro-lens 24 that is rounded in the X-Z plane (FIG. 2C). However, with specific reference to FIG. 5B, the micro-lens 24 formed in the reflow also is rounded in the X-Y plane. Specifically, the corners and edges of the intermediate lens structures 30 are pulled back from each other. This pull-back reduces the surface area of the micro-lenses 24, which will lead to a decrease in the amount of light collectable in, and hence transmittable from, the micro-lenses 24.

SUMMARY

Embodiments of the present invention provide an intermediate lens structure that includes a block of lens material formed on a wafer, wherein cut-out portions are removed from the block of lens material.

In other embodiments, the present invention provides a lithographic mask for forming a micro-lens from an intermediate lens structure. The lithographic mask includes a mask area and at least one exposure opening within the mask area adapted to form at least one cut-out portion in the intermediate lens structure.

In other embodiments, the present invention provides a lithographic mask array for forming an array of micro-lenses from a plurality of intermediate lens structures. The lithographic mask array includes an array of masks each including a mask area and at least one exposure opening within the mask area adapted to form at least one cut-out portion in a respective one of the intermediate lens structures.

In other embodiments, the present invention provides a lithographic mask array for forming an array of micro-lenses from a plurality of intermediate lens structures. The lithographic mask array includes a plurality of mask areas formed of an opaque material and at least one pull-back mask portion adapted to link a pair of intermediate lens structures together to retard pull-back of the resulting micro-lenses.

In other embodiments, the present invention provides a method for forming a micro-lens that includes the acts of coating a lens material on a support structure, exposing a portion of the lens material, removing unwanted portions and cut-out portions from the lens material, and reflowing the lens material to form the micro-lens.

In other embodiments, the present invention provides a method for forming a micro-lens array. The method includes the acts of coating a wafer, directing electromagnetic radiation through a lithographic mask array to expose portions of the plurality of intermediate lens structures, wherein the lithographic mask array includes a plurality of mask portions and at least one pull-back mask portion, removing unwanted portions from the intermediate lens structures, and reflowing the intermediate lens structures to form an array of micro-lenses.

In other embodiments, the present invention provides a method of forming a micro-lens from a material having a thickness and a surface area. The method includes the acts of forming an intermediate lens structure on a support structure from the material, reducing the mass of the material, and subsequently shaping the material into the micro-lens.

In other embodiments, the present invention provides a method of adjusting the focal length of a micro-lens. The method includes the acts of coating a transparent material having a mass onto a support structure, wherein the transparent material is capable of forming a micro-lens having a first focal length upon a reflows reducing the mass of the transparent material, and then reflowing the transparent material to form a micro-lens having a second focal length different from the first focal length.

In other embodiments, the present invention provides a method of forming a semiconductor micro-lens. The method includes the steps of fabricating a support surface, spin coating an intermediate lens structure on the support surface, patterning at least one cut-out portion in the intermediate lens structure, developing the at least one cut-out portion, and shaping the intermediate lens structure into the semiconductor micro-lens.

In other embodiments, the present invention provides a semiconductor micro-lens formed from an intermediate structure and having a radius defined during fabrication by reducing mass from a centralized portion of the intermediate structure.

These and other advantages and features of the invention will be more readily understood from the following detailed description of the invention which is provided in connection with the accompanying drawings.

DETAILED DESCRIPTION OF PREFERRED EMBODIMENTS

In the following detailed description, reference is made to the accompanying drawings, which form a part hereof and show by way of illustration specific embodiments in which the invention may be practiced. These embodiments are described in sufficient detail to enable those skilled in the art to practice the invention, and it is to be understood that other embodiments may be utilized, and that structural, logical, and electrical changes may be made without departing from the spirit and scope of the present invention. The progression of processing steps described is exemplary of embodiments of the invention; however, the sequence of steps is not limited to that set forth herein and may be changed as is known in the art, with the exception of steps necessarily occurring in a certain order.

The terms "wafer" and "substrate," as used herein, are to be understood as including silicon, silicon-on-insulator (SOI) or silicon-on-sapphire (SOS) technology, doped and undoped semiconductors, epitaxial layers of silicon supported by a base semiconductor foundation, and other semiconductor structures. Furthermore, when reference is made to a "wafer" or "substrate" in the following description, previous processing steps may have been utilized to form regions, junctions, or material layers in or over the base semiconductor structure or foundation. In addition, the semiconductor need not be silicon-based, but could be based on silicon-germanium, germanium, gallium arsenide or other semiconductors.

The term "pixel," as used herein, refers to a photo-element unit cell containing a photoconversion device and associated transistors for converting photons to an electrical signal. For purposes of illustration, a single representative two-color pixel and its manner of formation is illustrated in the figures and description herein; however, typically fabrication of a plurality of like pixels proceeds simultaneously. Accordingly, the following detailed description is not to be taken in a limiting sense, and the scope of the present invention is defined only by the appended claims.

Finally, while the invention is described with reference to a CMOS imager, it should be appreciated that the invention may be applied in any micro-electronic or micro-optical device that requires high quality micro lenses for optimized performance. Other suitable micro-optical devices include CCDs and displays.

With specific reference to FIGS. 3A-3D and FIG. 8, an intermediate lens structure 130 is shown to be formed into a micro-lens 124. The micro-lens 124 has a radius $R_2$ that is greater than the radius $R_1$ of the conventional micro-lens 24 (FIG. 2C). A larger lens radius moves the focal point for the light focused through the micro-lens. Specifically, the larger radius $R_2$ creates a focal point $F_2$, which is suitably situated to enhance the amount of light 26 received by the photoconversion device 14 and to decrease the amount of cross talk between the photoconversion devices 14.

Figure 8:
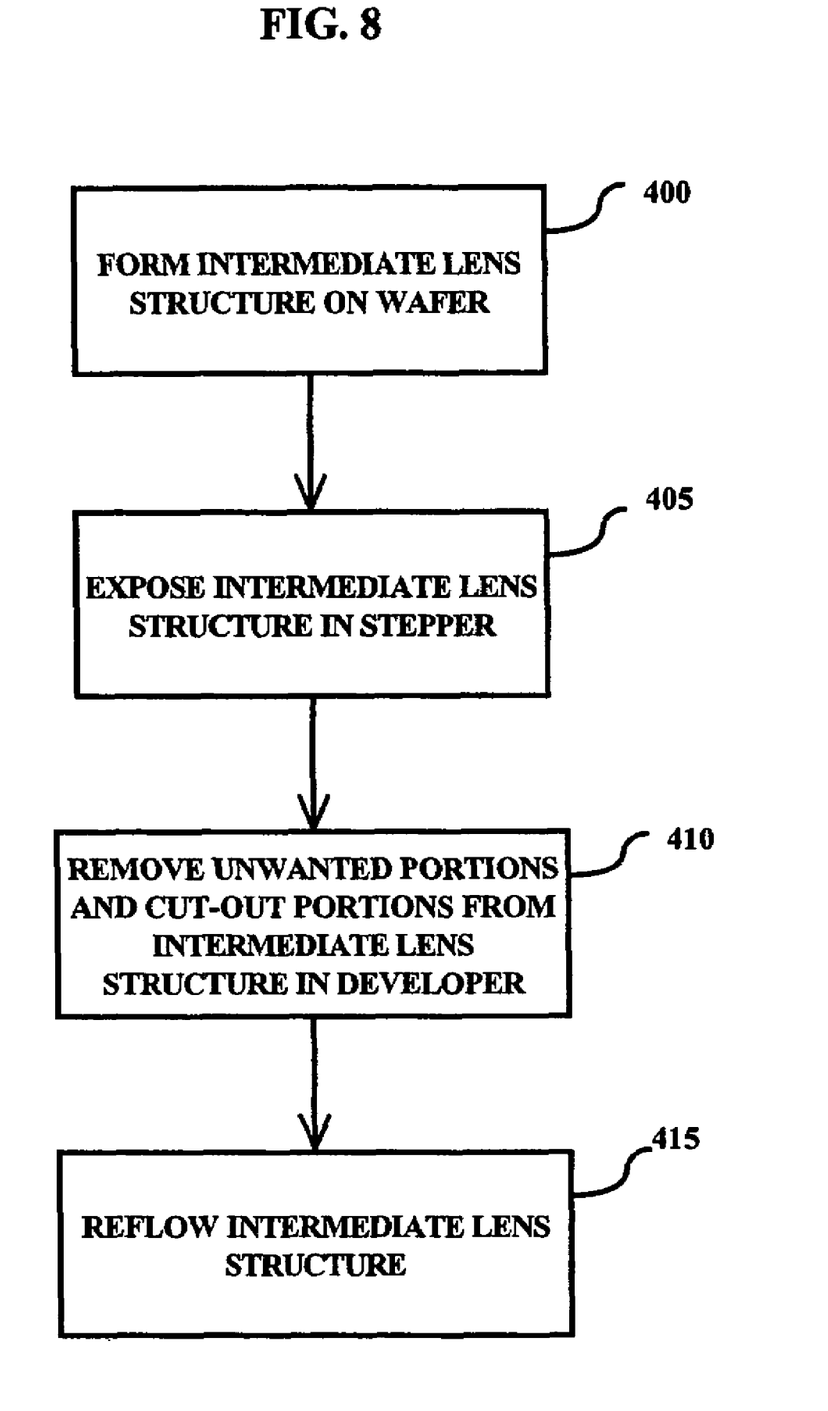
FIG. 8 illustrates process steps for forming a micro-lens in accordance with an embodiment of the invention.

The intermediate lens structure 130 includes a lens material 34 coated onto a wafer 32 at Step 400 (FIG. 8). Preferably, the lens material 34 is a transparent photosensitive polymer that is applied to a support surface, such as by spin coating on the wafer 32. The lens material 34 is then exposed on a lithographic stepper at Step 405. The lithographic stepper utilizes a lithographic mask to create a desired micro-lens design. The lithographic stepper mask includes an opaque material for forming mask areas and exposure areas that allow for the removal of cut-out portions 136 (FIGS. 3A, 3B) from a central part of the intermediate lens structure 130.

After exposure, the lens material 34 is developed in a wet developer to remove the unwanted portions and the cut-out portions 136 from the lens material 34 at Step 410. It should be appreciated that the cut-out portions 136 are not found on the periphery of the lens material 34, but instead are located more interiorly. If the photosensitive polymer material 34 is a positive resist, the unwanted portions and cut-out portions 136 are exposed at Step 405 and dissolved in the developer at Step 410. If the photosensitive polymer material 34 is a negative resist, the unwanted portions and cut-out portions 136 remain unexposed at Step 405 and are dissolved in the developer at Step 410.

Figure 3A:
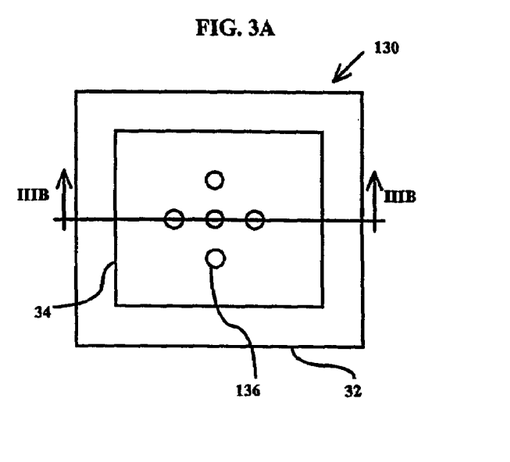
FIG. 3A is a plan view of an intermediate lens structure constructed in accordance with an embodiment of the invention.
Figure 3B:
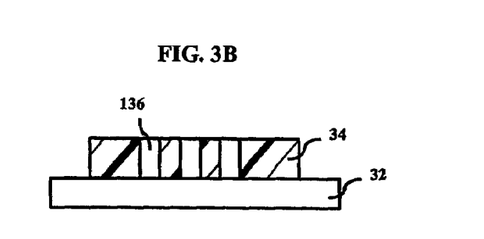
FIG. 3B is a cross-sectional view of the intermediate lens structure if FIG. 3A taken along line IIIB-IIIB.
Figure 3C:
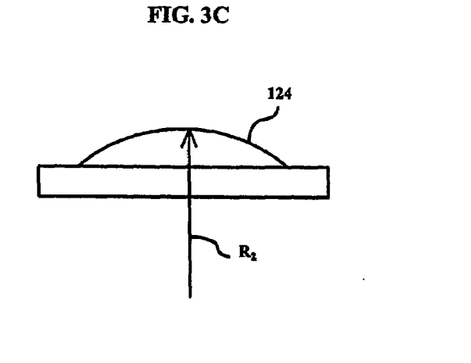
FIG. 3C is a side view of a micro-lens constructed from the intermediate lens structure of FIGS. 3A and 3B.
Figure 3D:
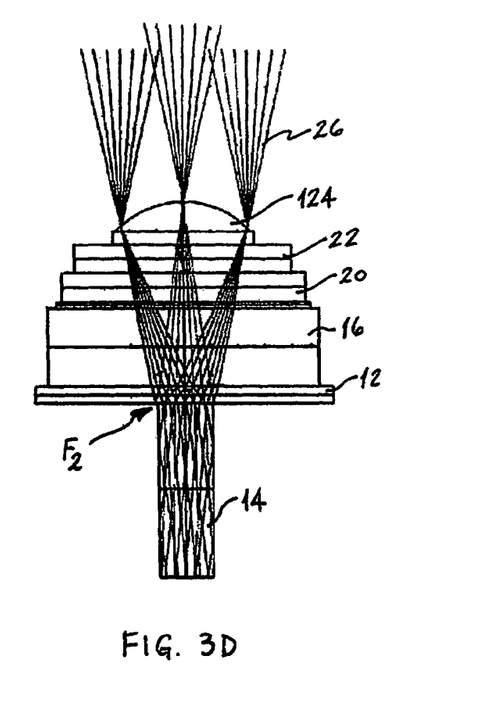
FIG. 3D is a side view of the micro-lens of FIG. 3C used with a CMOS imager in accordance with an embodiment of the invention.

At an optional Step 415, the lens material 34 is baked and or exposed to a certain dose and wavelength of optical light. This step will recondition or modify the reflow properties of the lens material 34, such as its viscosity. At Step 420, the lens material 34 is reflowed to create the micro-lens 124 (FIG. 3C). The micro-lens 124 has a longer radius $R_2$ than the radius $R_1$ of the conventional micro-lens 24 (FIG. 2C). Hence, the micro-lens 124 when used in a CMOS imager will exhibit a focal point $F_2$ (FIG. 3D) that focuses the light 26 into the photoconversion device 14 of the pixel cell 12 as opposed to above the cell (FIG. 2D).

Figure 4A:
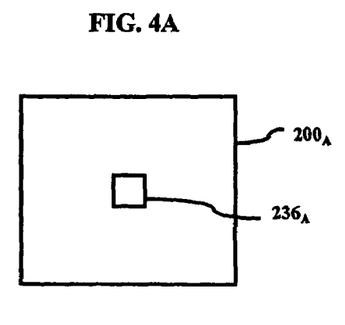
FIGS. 4A-4E are plan views of intermediate lens structures constructed in accordance with an embodiment of the invention.
Figure 4B:
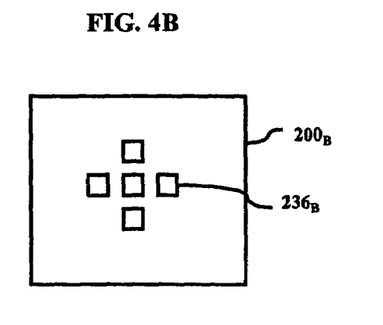
Figure 4C:
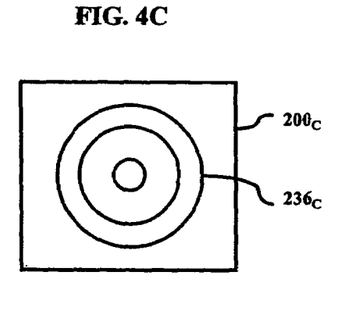
Figure 4D:
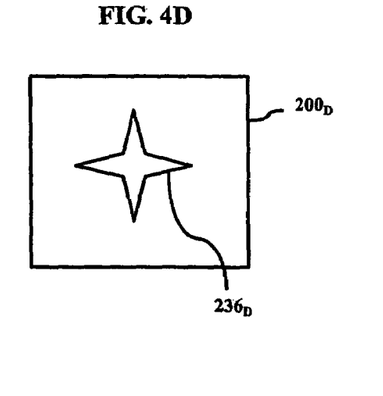
Figure 4E:
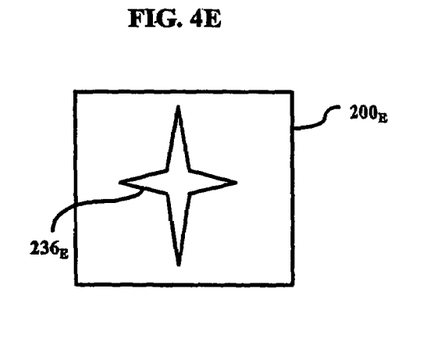
Figure 5A:
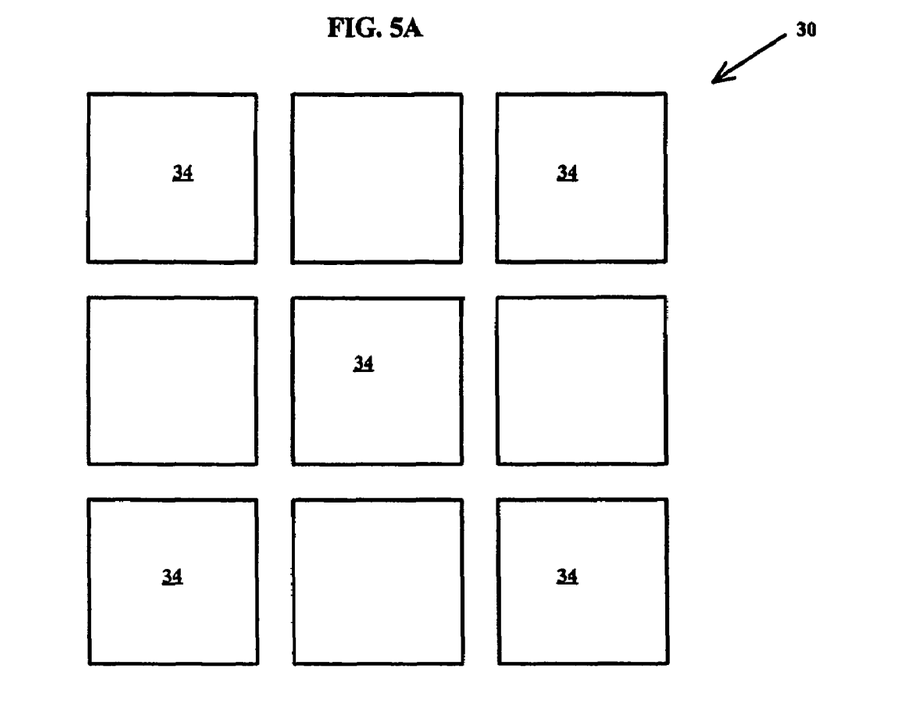
FIG. 5A is a plan view of an array of conventional intermediate lens structures.
Figure 5B:
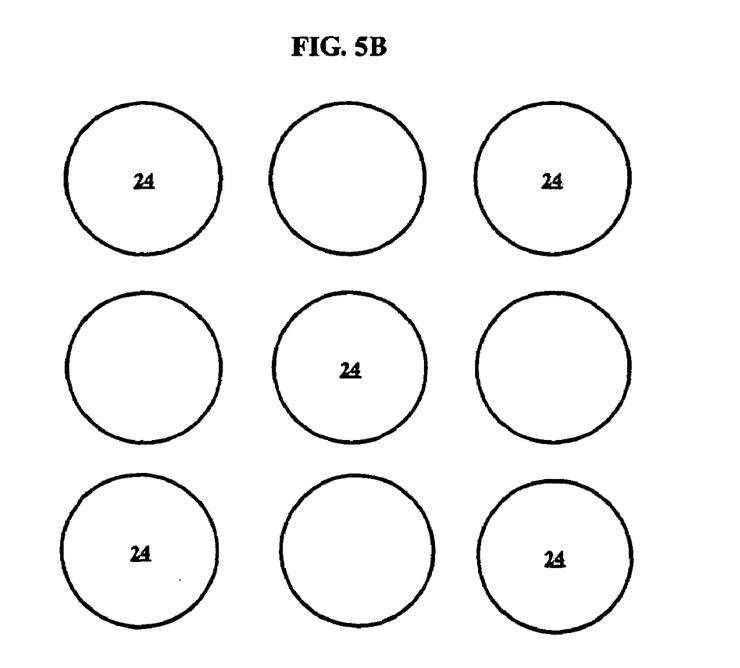
FIG. 5B is a plan view of an array of micro-lenses formed from the intermediate lens structures of FIG. 5A.

By utilizing a lithographic mask to remove cut-out portions, the shape of the micro-lenses can be adjusted within a wider range. Obviously, the lithographic mask can be designed to form micro-lenses adjusted for pixel cells of decreasing size. It is further possible to design the lithographic mask to have any number of symmetrical and non-symmetrical openings. With reference to FIGS. 4A-4E, various lithographic masks $200_{A-E}$ are illustrated. FIG. 4A illustrates a lithographic mask $200_A$ with a square exposure opening $236_A$ and FIG. 4B illustrates a lithographic mask $200_B$ with a plurality of square exposure openings $236_B$. FIG. 4C illustrates a lithographic mask $200_C$ with a plurality of circular exposure openings $236_C$. FIGS. 4D and 4E illustrate, respectively, lithographic masks $200_D$ and $20_E$ that have star-shaped exposure openings, one ($236_D$) being symmetrical and the other ($236_E$) being non-symmetrical.

Figure 6:
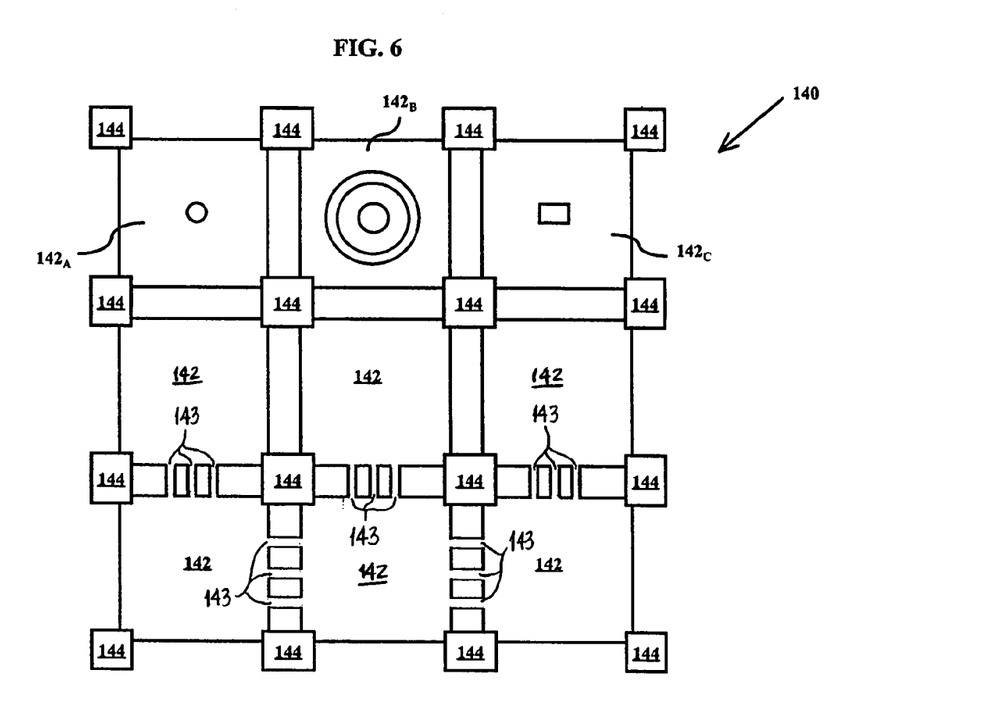
FIG. 6 is a plan view of a mask for forming an array of micro-lenses in accordance with an embodiment of the invention.
Figure 9:
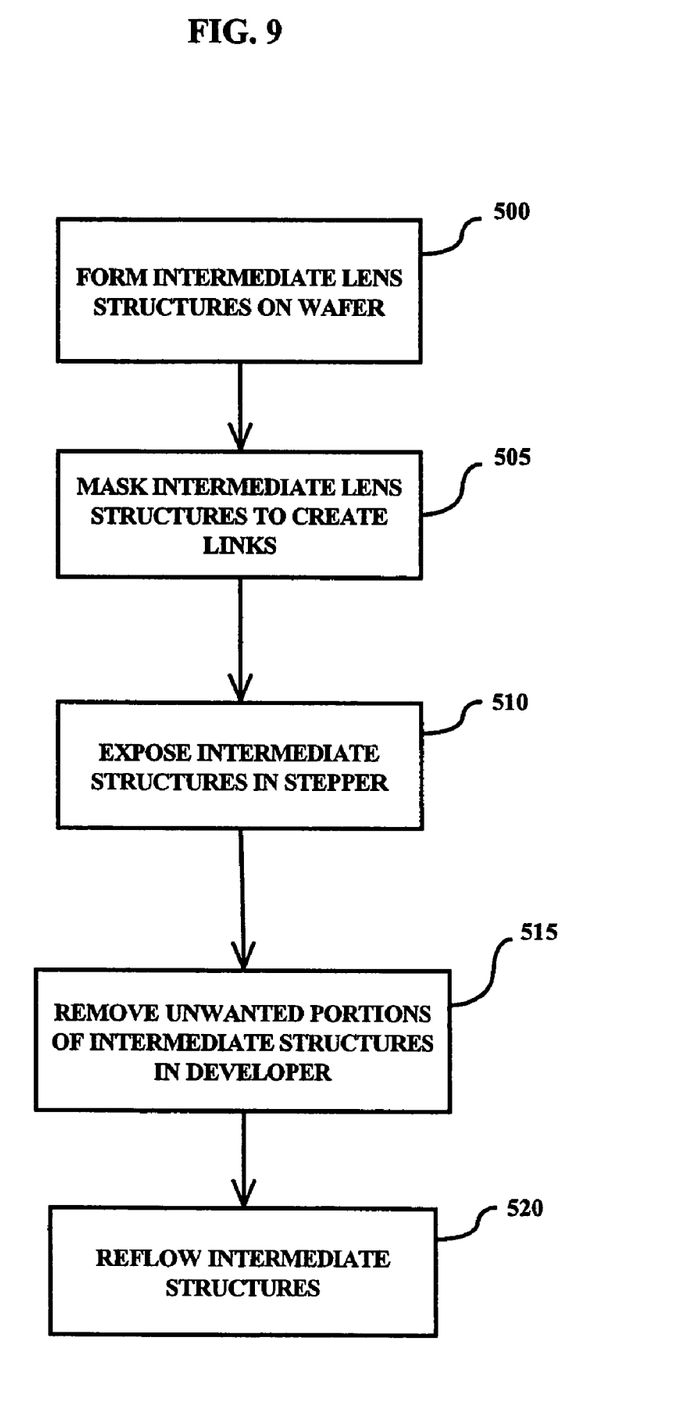
FIG. 9 illustrates process steps for forming a micro-lens in accordance with another embodiment of the invention.

Referring now to FIGS. 6 and 9, another embodiment of the invention is now described. As noted previously and illustrated in FIGS. 5A and 5B, one undesirable aspect in the formation of micro-lenses is the tendency of the micro-lenses to pull back at the corners and/or edges.

FIG. 6 illustrates a lithographic mask array 140 with a plurality of lithographic masks 142, each for use in forming a respective micro-lens. As shown, one mask $142_A$ includes a single circular exposure opening, another mask $142_B$ includes a pair of circular exposure openings, and a third mask $142_C$ includes a rectangular exposure opening. It should be understood that any appropriate design may be used in the masks 142, and the remaining masks 142 may also include appropriate designs.

Further shown in FIG. 6 are mask portions 143 which connect adjacent lithographic masks 142. The mask portions 143 assist in controlling the shape of thus formed micro-lenses by suppressing pull-back along the sides of the masks 142. It should be appreciated that the mask portions 143 may vary in size and quantity from the mask portions 143 illustrated in FIG. 6.

Figure 7A:
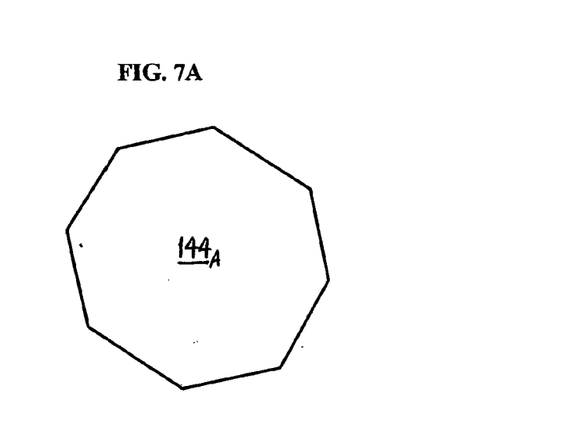
FIGS. 7A-7F illustrate various suitable shapes for the pull-back mask portions of FIG. 6.
Figure 7B:
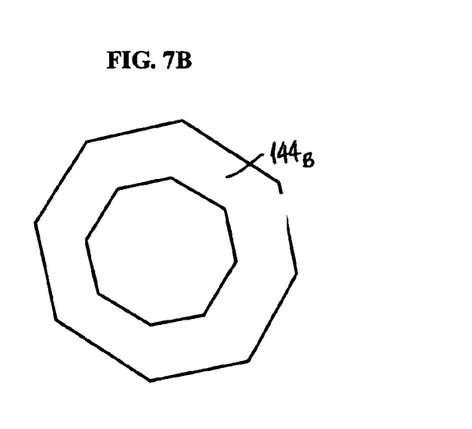
Figure 7C:
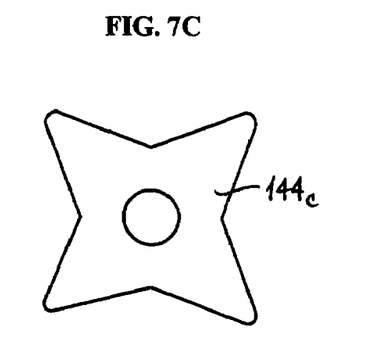
Figure 7D:
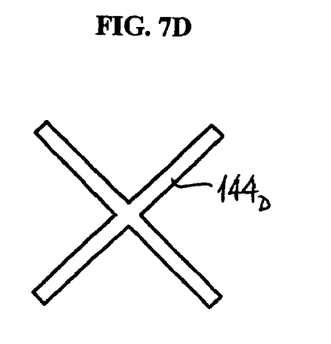
Figure 7E:
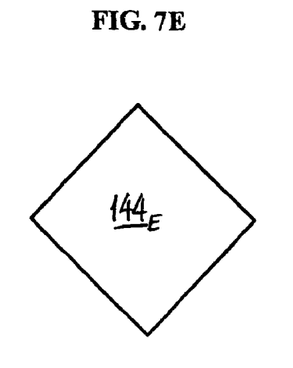
Figure 7F:
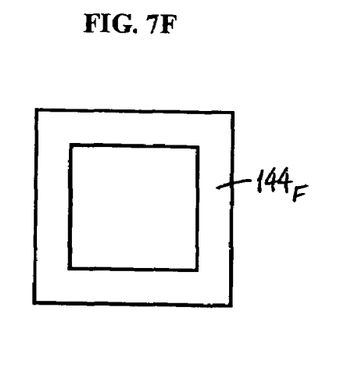

The lithographic mask array 140 further includes a plurality of pull-back mask portions 144. The pull-back mask portions 144 increase the light collection area of the micro-lenses thus formed by inhibiting the pull-back of the micro-lenses during formation. While the pull-back mask portions 144 are shown located at corners of the masks 142, it should be appreciated that the pull-back mask portions 144 can also be located along the sides of the masks 142 to inhibit pull-back along the sides. Although the pull-back mask portions 144 are shown to be rectangular in FIG. 6, FIGS. 7A-7F illustrate other suitable shapes for the pull-back mask portions. Specifically, FIG. 7A illustrates an octagonal pull-back mask portion $144_A$ and FIG. 7B illustrates another octagonal pull-back mask portion $144_B$ with an open interior portion. FIG. 7C illustrates a four-pointed star pull-back mask portion $144_C$ that includes an open interior portion, but it should be appreciated that more or less than four points can be utilized and the open interior portion may instead be filled. FIG. 7D illustrates an X-shaped pull-back mask portion $144_D$ and FIG. 7E illustrates a diamond-shaped pull-back mask portion $144_E$. Finally, FIG. 7F illustrates a rectangular pull-back mask portion $14_F$ that includes an open interior portion.

Next will be described the functioning of the lithographic mask array 140. First, at Step 500, a lens material 34 is coated on a wafer. Preferably, the lens material 34 is formed of a polymer and is spun onto the wafer. Then, at Step 505 the lithographic masks of the lithographic mask array 140 are used to mask the lens material 34. At Step 510, the lens material 34 is exposed in a lithographic stepper. Then, at Step 515 the unwanted portions of the lens material 34 are removed in a wet developer. Finally, at Step 520 the lens material 34 is reflowed. The mask portions 144 cause the intermediate lens structures to become linked during the imaging step, which retards pull-back of the micro-lenses during the reflow step.

It should be appreciated that in certain instances, it is necessary to adjusting the micro-lens optical properties across an entire system including numerous micro-lenses to sharpen an image. For example, if the imager is a camera module, the images obtained through the camera module, which includes numerous micro-lenses, may be sharpened by adjusting the micro-lens optical properties across the entire die. By doing so, optical distortions and lens artifacts of the camera lens system can be compensated for. The focal length and the location of each micro-lenses' focal points can be manipulated through a proper layout of micro-lenses.

While the invention has been described in detail in connection with exemplary embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed is:

1. A method for forming a micro-lens, comprising: coating a lens material on a support structure; removing portions from the lens material, said removed portions being located at an interior of the lens material; and reflowing the lens material to form the micro-lens.

2. The method of claim 1, wherein the act of removing comprises exposing the lens material by directing electromagnetic radiation through a lithographic mask at the lens material.

3. The method of claim 2, wherein the lithographic mask includes a mask area and at least one exposure opening adapted to form at least one removed portion in the lens material.

4. The method of claim 3, wherein the lens material comprises a transparent photosensitive polymer.

5. The method of claim 4, wherein the transparent photosensitive polymer is a positive resist wherein the electromagnetic radiation is directed through the at least one exposure opening to expose the portion of the lens material and the exposed portion of the lens material is removed.

6. The method of claim 4, wherein the transparent photosensitive polymer is a negative resist wherein the electromagnetic radiation is directed through the at least one exposure opening to expose the portion of the lens material and an unexposed portion of the lens material is removed.

7. The method of claim 3, wherein the at least one exposure opening is non-symmetrical.

8. The method of claim 3, wherein the at least one exposure opening is symmetrical.

9. The method of claim 1, further comprising baking the lens material prior to the reflow step to recondition reflow properties of the lens material.

10. The method of claim 1, wherein the act of removing comprises removing the lens material in the removed portion down to a top surface of the support structure.

11. A method for forming a micro-lens array, comprising: coating a wafer to form a plurality of intermediate lens structures on the wafer; directing electromagnetic radiation through a lithographic mask array to expose portions of the plurality of intermediate lens structures, wherein the lithographic mask array includes a plurality of mask portions and at least one pull-back mask portion; removing at least one portion from the intermediate lens structures; and reflowing the intermediate lens structures to form an array of micro-lenses.

12. The method of claim 11, wherein at least one mask portion includes at least one exposure opening adapted to form at least one removed portion in a respective one of the intermediate lens structures.

13. The method of claim 11, wherein the act of coating comprises spinning on a polymer material.

14. The method of claim 13, wherein the act of removing comprises using a developer to remove the at least one portion of the intermediate lens structures down to a top surface of said wafer.

15. The method of claim 13, wherein the polymer is a positive resist and the act of removing comprises removing at least one portion of the intermediate lens structure that has been exposed.

16. The method of claim 13, wherein the polymer is a negative resist and the act of removing comprises removing at least one portion of the intermediate lens structure that remains unexposed.

17. The method of claim 11, wherein at least some of the plurality of mask portions are connected to at least one respective adjacent mask portion.

18. The method of claim 11, wherein said at least one pull-back mask portion is located at a corner of a lithographic mask in the array.

19. The method of claim 11, wherein the pull-back portion is formed in one of the following shapes: rectangle, octagon, diamond, star, and x-shape.

20. A method of forming a micro-lens from a material having a thickness and a surface area, comprising: forming an intermediate lens structure on a support structure from the material; reducing the mass of the material by removing a predetermined amount from the interior of the material; and subsequently shaping the material into the micro-lens.

21. The method of claim 20, wherein said act of shaping comprises reflowing the material.

22. A method of adjusting the focal length of a micro-lens, comprising: coating a transparent material having a mass onto a support structure, wherein said transparent material is capable of forming a micro-lens having a first focal length upon a reflow; reducing the mass of the transparent material; and reflowing the transparent material to form a micro-lens having a second focal length different from the first focal length.

23. The method of claim 22, wherein said act of reducing the mass of the transparent material comprises removing a portion of said transparent material to form at least one cut-out portion.

24. The method of claim 22, wherein the transparent material is capable of forming a micro-lens having a first radius, and the act of reflowing to form a micro-lens comprises forming a micro-lens having a second radius, the second radius being larger than the first radius.

25. A method of forming a semiconductor micro-lens, comprising: fabricating a support surface; spin coating an intermediate lens structure on the support surface; patterning at least one removable portion in the interior of the intermediate lens structure; developing the at least one removable portion; and shaping the intermediate lens structure into the semiconductor micro-lens.

26. The method of claim 25, wherein said act of shaping comprises reflowing the intermediate lens structure.

* * * * *